E. F. NORTHRUP.
METHOD OF AND MEANS FOR UTILIZING THE PRESSURE IN THE INTERIOR
OF AN ELECTRIC CONDUCTOR CARRYING CURRENT.
APPLICATION FILED MAR. 1, 1907.

902,106.

Patented Oct. 27, 1908.

Witnesses:
Jas. E. Hutchinson
L. E. Montague.

Inventor:
Edwin F. Northrup.
John H. Hall
By  his Attorney.

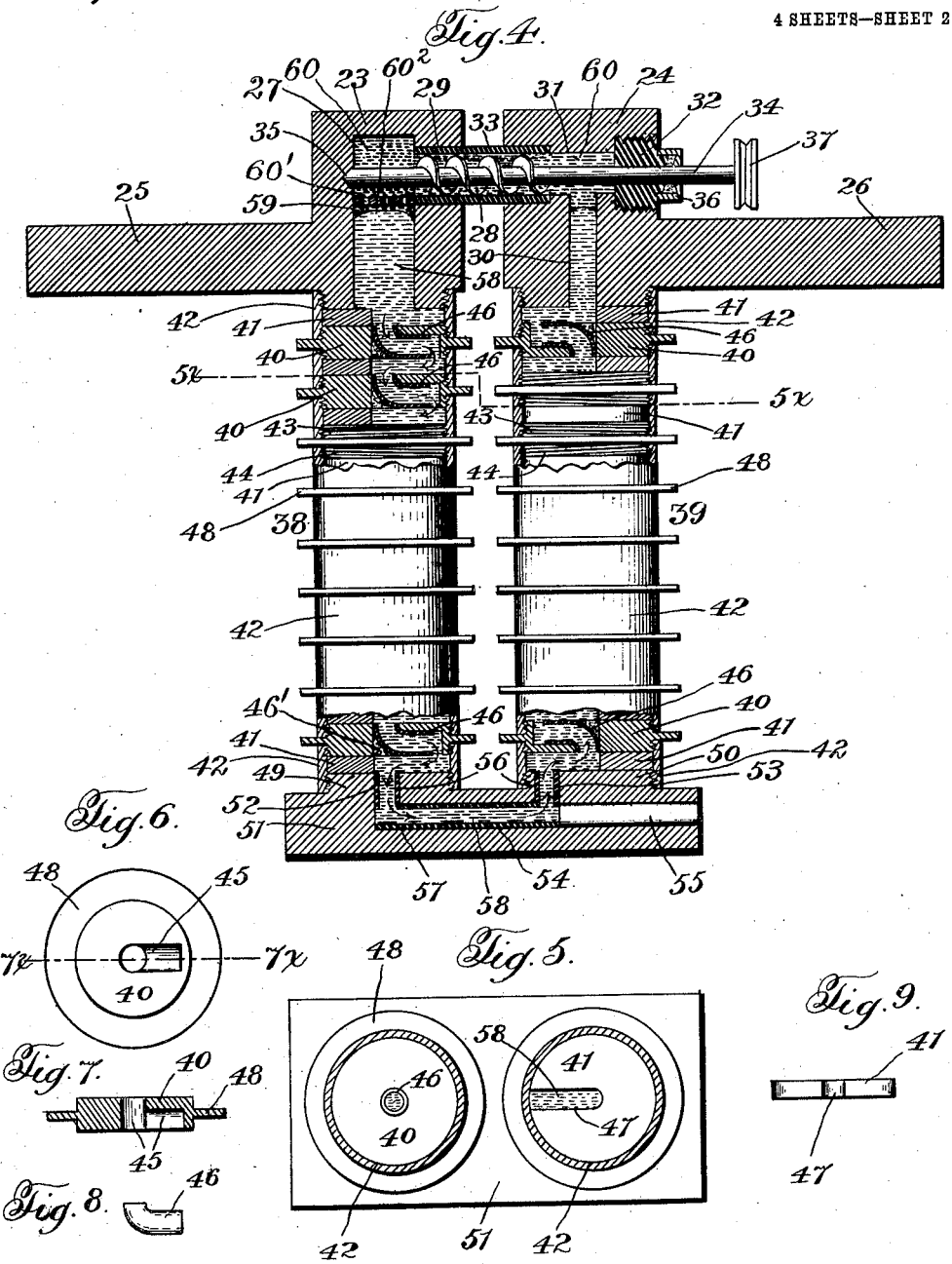

E. F. NORTHRUP.
METHOD OF AND MEANS FOR UTILIZING THE PRESSURE IN THE INTERIOR
OF AN ELECTRIC CONDUCTOR CARRYING CURRENT.
APPLICATION FILED MAR. 1, 1907.
902,106.
Patented Oct. 27, 1908.
4 SHEETS—SHEET 3.
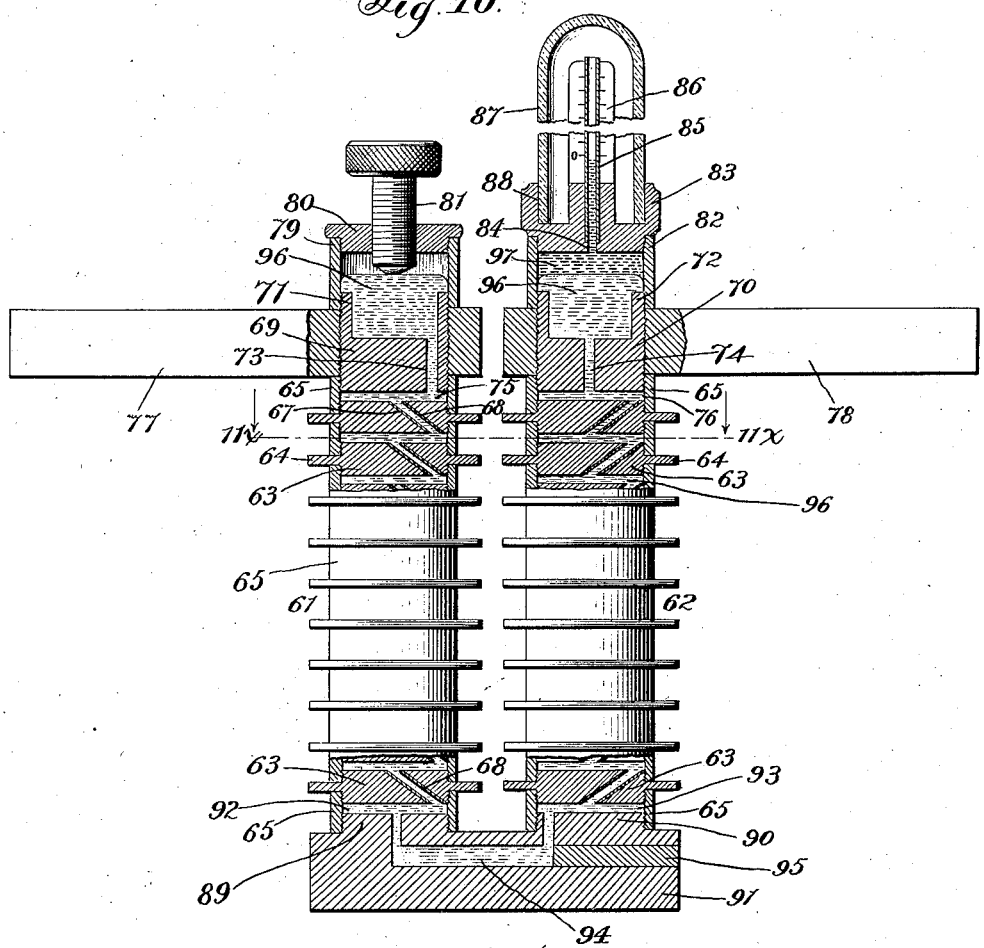
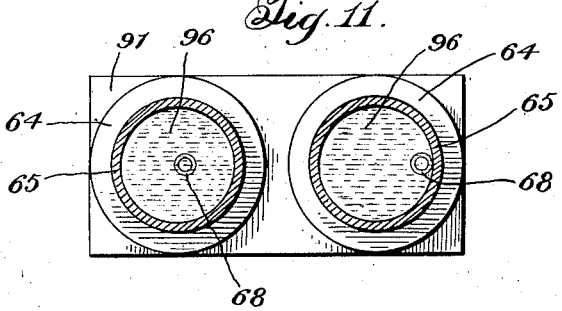

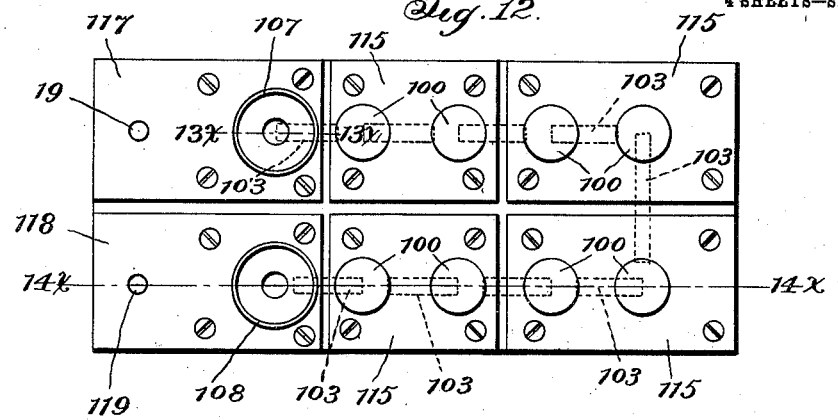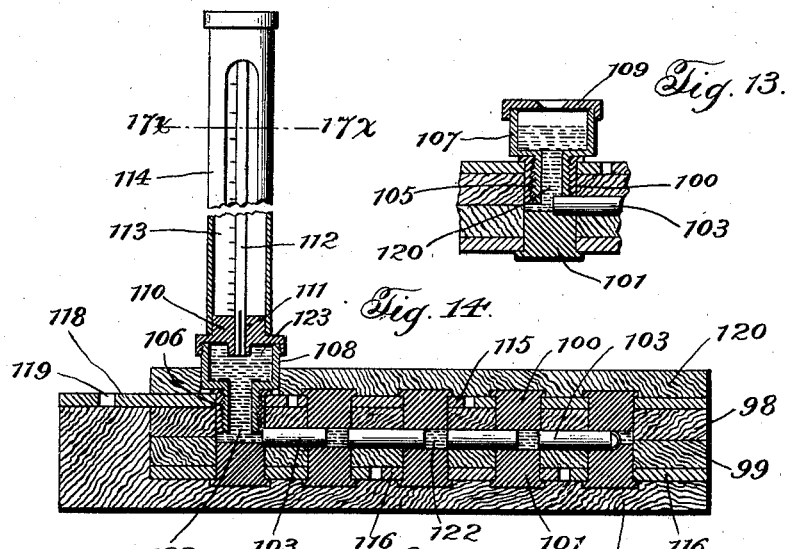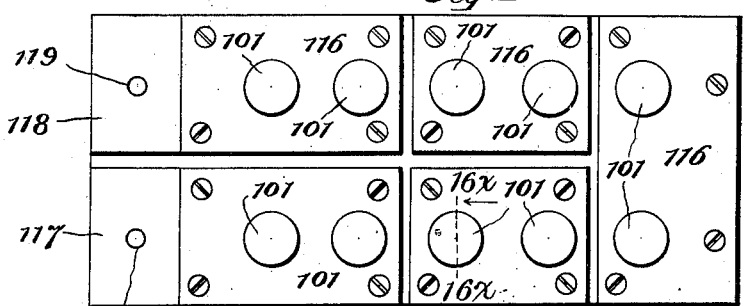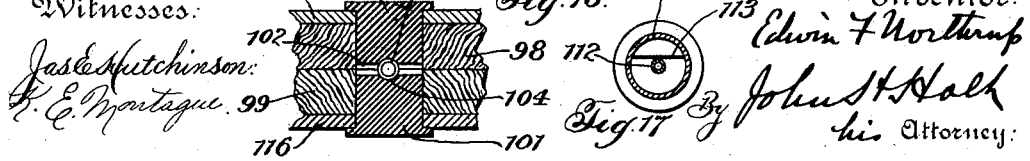

UNITED STATES PATENT OFFICE.

EDWIN F. NORTHRUP, OF PHILADELPHIA, PENNSYLVANIA, ASSIGNOR TO THE LEEDS AND NORTHRUP COMPANY, OF PHILADELPHIA, PENNSYLVANIA, A CORPORATION OF PENNSYLVANIA.

METHOD OF AND MEANS FOR UTILIZING THE PRESSURE IN THE INTERIOR OF AN ELECTRIC CONDUCTOR CARRYING CURRENT.

No. 902,106.　　　　Specification of Letters Patent.　　　　Patented Oct. 27, 1908.

Application filed March 1, 1907.　Serial No. 359,983.

*To all whom it may concern:*

Be it known that I, EDWIN F. NORTHRUP, a citizen of the United States, residing at Philadelphia, in the county of Philadelphia and State of Pennsylvania, have invented certain new and useful Improvements in Methods of and Means for Utilizing the Pressure in the Interior of an Electric Conductor Carrying Current, of which the following is a specification.

The primary object of this invention is the utilization of the pressure within the mass of an electric conductor, due to the passage of an electric current therethrough, to produce useful motion or work of any kind to which the force may be adapted, such for example as the operation of motors, dynamos, electric meters and measuring instruments of various kinds and for various other purposes.

With the above objects in view my said invention comprises the novel method and apparatus herein described and more particularly pointed out in the accompanying claims.

Figure 1:
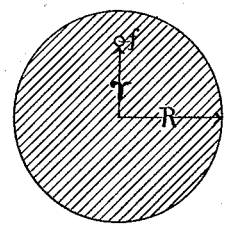
Figure 2:
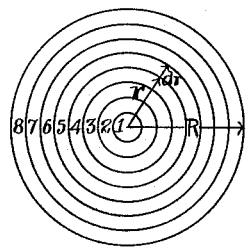
Figure 3:
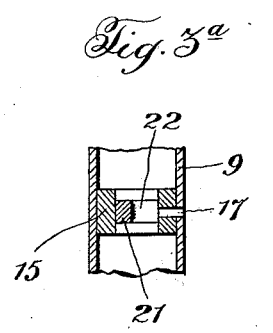
Figure 3:
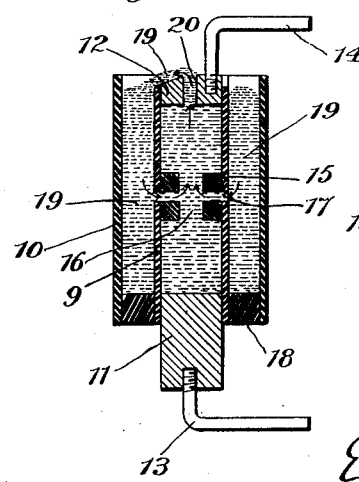

In order to more fully describe my said invention, reference will be had to the accompanying drawings wherein, Figures 1 and 2 are diagrams to illustrate the pressure on the interior of an electric conductor; Fig. 3, a diagram to further illustrate the principle of my invention; Fig. 3$^a$, a fragmentary sectional view of a modification of the device shown in Fig. 3; Fig. 3$^b$, a top plan of parts shown in Fig. 3$^a$; Fig. 4, a vertical section partly in elevation of a motor embodying my invention; Fig. 5, a section on line 5$^\times$—5$^\times$, Fig. 4, looking down; Fig. 6, a bottom plan view of one of the non-magnetic conducting elements; Fig. 7, a section on line 7$^\times$—7$^\times$, Fig. 6; Fig. 8, a detail side elevation of one of the small tubes for conveying the liquid conductor from the center to the periphery of a non-magnetic element; Fig. 9, a front elevation of one of the magnetic metal disks inserted between the non-magnetic elements; Fig. 10, a vertical central section partly in elevation of an ammeter embodying my said invention; Fig. 11, a section on the line 11$^\times$—11$^\times$ of Fig. 10; Fig. 12, a top plan view with top cover removed of a form of ammeter embodying my invention; Fig. 13, a fragmentary section along the line 13$^\times$—13$^\times$ Fig. 12; Fig. 14, a section on line 14$^\times$—14$^\times$, Fig. 12, with the top and bottom covers, and the current indicating attachment in place; Fig. 15, a bottom plan view of the instrument with bottom cover removed; Fig. 16, an enlarged detail fragmentary section on line 16$^\times$—16$^\times$, Fig. 15 looking in the direction of the arrow, and Fig. 17, a section on line 17$^\times$—17$^\times$, Fig. 14, of the reading attachment.

In order to make clearer the principle and operation of some specific forms of practical apparatus, embodying my invention it will be well first to consider the physical forces which produce the pressure in the interior of a non-magnetic liquid conductor carrying an electric current and the law governing the pressure set up by these forces.

Referring to Fig. 1, let the large circle represent the periphery of a non-magnetic liquid conductor of circular cross-section, and suppose there is located in this conductor, at distance $r$ from the axis a small solid conductor $f$. Let this small solid conductor be a wire parallel to the axis of the liquid conductor and located at a distance $r$ from the axis of said liquid conductor. If a current I pass through the liquid conductor of radius R, the small wire $f$ will be in a field of force of intensity $$T r = \frac{2 I r}{R^2}.$$

If current is passing in the same direction through the liquid conductor and the wire $f$, the wire will experience a force, if the current density in it is greater than the current density in the liquid conductor, which will tend to move the wire across the lines of force in a direction to bring it toward and parallel to the axis of the liquid conductor.

In place, now, of an actual wire on the inside of the liquid conductor we may picture this liquid column as made up of a great many filaments, each filament carrying a current proportional to the total current and to the cross section which we conceive any filament to have. Each filament, except the one on the axis will find itself in a field of magnetic force. Those filaments near the circumference will be in a field of greater intensity than those near the axis. Hence all the filaments, except the one on the axis, will experience a force which, if free to act, will urge them toward the axis of the conducting liquid column. The result will be that the liquid column will be under a greater hydrostatic pressure at its axis than at its circumference. We may determine the magnitude of this pressure at different distances from the axis by the following considerations: Let Fig. 2 represent the cross-section of a cylindrical conductor. Conceive this cross-section to be made up of a large number of annular spaces as 1, 2, 3, etc. Let the radial depth of each of these annular spaces be called $dr$. Let R be the radius of the cylindrical conductor, and $r$ the radial distance from the axis to any point within the circular cross-section. It should further be supposed that the conductor is of very great length, having its axis perpendicular to the plane of the paper, and far removed from any return circuit. By the theory all portions of the conductor, as the annular sections 1, 2, 3, etc., are under the influence of a force, when the conductor is carrying a current, which tends to urge them radially toward the axis. This force, as measured in dynes, will have at any point distant $r$ from the axis, a definite value per unit of area. The total force or pressure which acts upon the surface of any imaginary cylinder of radius $r$ and length $l$, will be, evidently, the force per unit of area multiplied by the total area of a length $l$ of this imaginary cylinder.

It is first required, to find the force, $g$, per unit of area, at any point within the conductor distant $r$ from the axis, and second, the force or pressure P on the surface of an imaginary cylinder of radius $r$, and axial length $l$. This problem may be solved by conceiving the action of the magnetic field on all portions of the conductor carrying current, or by considering only the mutual attractions of all the elements of the conductor.

By the first method, we may proceed as follows: At a point within the conductor distant $r$ from the axis the intensity of the magnetic field is $$T = \frac{2Ir}{R^2} \quad \text{------(1)}$$

where I is the total current flowing in the conductor. The lines of force of this field are circles, having as their common axis, the axis of the conductor. Consider any single annular space as 5. It will carry current $di$, which is in the same ratio to the total current as the area of the annular space is to the total area of the cross section of the conductor. If we call $da$, the area of the annular space which has an inside boundary of radius $r$, we have $$da = \pi(r+dr)^2 - \pi r^2 = 2\pi r dr,$$

since the square of $dr$ can be neglected. Then, as $\pi R^2$ is the total area, we obtain $$di = \frac{2Ir dr}{R^2} \quad \text{------(2)}$$

This current, $di$, is disposed in a field of intensity $$Tr = \frac{2Ir}{R^2}.$$

If the current I flows downward, the lines of force would act on a unit north pole to move it in a clockwise direction around the axis; and an element of this conductor carrying a downward current would tend to move radially toward the axis. If the direction of the current were reversed, the direction of the magnetic lines would be reversed but the current elements would still tend to move toward the axis. The force in dynes with which a length $l$ of any conductor is acted upon to move at right angles to the lines of magnetic force is, in electro-magnetic measure, numerically equal to the product of the length of the conductor, to the strength of the current in the conductor and to the field intensity where the conductor is located. (Maxwell Vol. II §490.) Thus calling $dF$ the force with which the element carrying the current $di$ tends to move radially toward the axis, we have $$dF = l di Tr = \frac{4I^2 l r^2 dr}{R^4} \quad \text{------(3)}$$

It should be noted that the force, $dF$, is distributed so as to act normally on a surface the area of which is $2\pi r l$. Hence calling $dg$ the force per unit of area, or the force intensity acting radially inward, we have $$\frac{dF}{2\pi r l} = dg = \frac{2I^2 r dr}{\pi R^4} \quad \text{------(4)}$$

This is the intensity of the pressure at distance $r$ from the axis, due to the current in a single annular space of radial depth $dr$. It is necessary in order to obtain the total intensity, $g$, at the distance $r$ from the axis, to take the sum of the force intensities due to the currents in all the annular spaces, each of radial depth $dr$, which lie in the space included between the radius R and the radius $r$. This sum is given by the integral $$g = \frac{2I^2}{\pi R^4} \int_r^R r dr,$$

Performing the integration, we have $$g = \frac{I^2}{\pi R^4}(R^2 - r^2) \quad \text{------(5)}$$

Equation (5) gives the inward radial pressure per unit of area on the material of the conductor itself at any distance $r$ from the axis of the conductor. If I is the current per unit of cross-section, or the current density in the conductor, $I^2 = I_1^2 \pi^2 R^4$, and we obtain as another expression for the pressure $$g = \pi I_1^2 (R^2 - r^2) \quad \text{------(6)}$$

The pressure at the center, where $r=0$, is therefore equal to the area of the cross-section of the conductor multiplied by the square of the current density. The total pressure on the surface of an imaginary cylinder of length $l$ and radius $r$ is, evidently, the force per unit of area multiplied by the total area of the surface of the cylinder considered. Calling P this pressure, we have:

$$P = \frac{2lI^2 r}{R^4}(R^2 - r^2) \quad \text{(7)}$$

or $$P = 2\pi l I_1^2, 2r(R^2 - r^2) \quad \text{(8)}$$

These same expressions are easily obtained by conceiving the imaginary conducting shells to exert an attraction according to the law of mutual attraction between currents flowing parallel and in the same direction. The law of attraction between any two infinitely long parallel conductors distant $r$ from each other and carrying currents $i$ and $i_1$, is $$F = 2ii_1 \frac{l}{r} \quad \text{(9)}$$

Here $l$ is the portion considered of the length of one of the conductors. (See Maxwell, Vol. II, §495.)

In the case under consideration, we can take one of the conductors to be the cylinder of radius $r$ and the other conductor to be the annular area of inside radius $r$ and outside radius $r + dr$. If I is the total current in the large conductor of radius R, the current carried by the conductor of radius $r$ is $$i = \frac{r^2}{R^2}I,$$

uniform current density being supposed.

$2\pi r dr$ is, as previously found, the cross-section of the annular area and the current which it carries is therefore $$di = \frac{2r dr}{R^2}I \quad \text{(10)}$$

The current $i$ and $di$ attract and produce a pressure over the surface of the cylinder of radius $r$. Calling $dF$ this pressure, we have $$dF = \frac{2i\, di\, l}{r} = \frac{4l I^2 r^2 dr}{R^4}.$$

The pressure per unit of area is:

$$\frac{dF}{2\pi r l} = dg = \frac{2I^2 r dr}{\pi R^4}$$

whence, in integrating, we obtain $$g = \frac{2I^2}{\pi R^4}\int_r^R r\, dr = \frac{I^2}{\pi R^4}(R^2 - r^2) \quad \text{(11)}$$

and $$P = \frac{2lI^2 r}{R^4}(R^2 - r^2) \quad \text{(12)}$$

These last two expressions are seen to be identical with (5) and (7).

*Attraction in the interior of a conductor.*— The attraction in the interior of a cylindrical conductor carrying $I_1$ units of current per unit of cross-section which would be exerted upon a unit length of a unit of current distant $r$ from the axis, may be found as follows:

In equation (9) let $l = 1$, and we have $$F = \frac{2ii_1}{r}$$

The current carried by the conductor of radius $r$ is $$i = \frac{r^2}{R^2}I$$

which combined with the above gives $$F = \frac{2ri_1 I}{R^2}$$

calling $I_1$ the current per unit of cross-section of the conductor and taking $i_1$ equal to unity, we find $$F_t = 2\pi I_1 r \quad \text{(13)}$$

Equation (13) expresses the attraction in the interior of a conductor carrying current. It is analogous to the gravitational attraction in the interior of a body of the same form as the conductor, due to its mass only.

Having thus determined, it is believed for the first time, the law of the hydrostatic pressure existing in the mass of a conductor of circular cross-section carrying an electric current, a reference to Fig. 3, will further illustrate and prove the said law. Referring to said figure, 9 represents a tube of insulating material of 2.54 C. M. interior diameter and 10 another tube of insulating material of about 4 C. M. inside diameter; 11 and 12, plugs of brass or copper inserted in the ends of tube 9; 13 and 14 copper terminals to be connected to a source of current, 15 a plug of fiber or other insulating material inserted in tube 9 about midway of the length of said tube, and having a vertical opening 16 through its center of a radius of .635 C. M. Through the sides of the tube 9 and plug 15 are openings 17 which pass into the central opening 16. The openings 17 in the apparatus constructed had an inside diameter of 3.2 MM. The bottom of the space between the tubes 9 and 10 is closed by a ring of insulating material 18, 19 indicates mercury and 20 a hole or passage through plug 12 to permit the mercury to flow from the tube 9 into tube 10.

According to the theory herein given when current is passed through the mercury column in the tube 9 a hydrostatic pressure should be produced along the axis of the column of mercury. Hence as the mercury has no other escape than the hole 20 provided in the brass plug 12, it should rise in this hole, being at the same time drawn in at the holes 17. Sufficient pressure should raise the mercury in the hole 20 until it overflows the upper surface of the plug 12 and falls back into the tube 10, from whence it came. Thus a continuous stream of mercury should flow by the path, through the holes 17, up the tube 9 and the hole 20 into the tube 10 and thence again to the holes 17. When sufficient current was used these results were amply realized, the mercury flowing in a rapid stream as described. It was found, however, that the same pressure may be obtained with a much smaller current if within the plug 15 is inserted a small soft iron plug 21 (see Figs. 3$^a$ and 3$^b$) provided with a slot to register with opening 17. The reason for this is the greatly increased intensity of the magnetic field in the slot 22 due to the iron. The conducting mercury filaments in the slot are therefore urged with increased force towards the axis of the tube 9 and the hydrostatic pressure at the axis is likewise increased.

Based upon the foregoing theory I have devised several forms of apparatus for the conversion of the pressure in the mass of the liquid conductor into useful results.

In Figs. 4 to 9 I have shown the principle embodied in an electric motor wherein there is a continuously moving element—a rotary body in the case shown. In said figures, 23 and 24 indicate conductor heads preferably of copper having terminus 25 and 26 for connection to a source of current. The head 23 is provided with a cylindrical chamber 27 opening through the bottom of said head and through the side as at 29. The head 24 has a smaller vertical chamber 30 opening through the bottom, and a horizontal passage 31, passing entirely through its upper portion and opening into chamber 30. One end of passage 31 is closed by means of a screw plug 32, of insulating material while into the other end of said passage passes a tube 33 of insulating material. The other end of said tube passes into the opening 29, the said tube filling both of said openings tightly. Within the tube 33 is mounted a propeller screw 28, carried on a shaft 34 connected at one end as at 35 and at its other end passing through plug 32 and stuffing box 36 on said plug. The shaft 34 may carry a pulley 37, or may be connected in any other desired way to the apparatus it is intended to operate.

Secured to the heads 23 and 24 respectively are two cylindrical members 38 and 39 each of which is built up of a series of non-magnetic conductor elements 40, soft iron disks 41 inserted between said elements, and metal rings 42. The elements 40 are screw threaded externally, as at 43 and 44 and these engage interior screw threads on the rings 42 of high resistance metal. Each of said elements 40 is also recessed as at 45 (see Figs. 6 and 7) and in each of said recesses is mounted a small tube 46 of insulating material leading from a point at the center of the top of the element to a point near the periphery thereof.

Each disk 41 is provided with a slot 47 (see Figs. 5 and 9) which communicates with tubes 46 both above and below. Annular flanges 48 are provided on the elements 40 to radiate the heat.

The lowermost rings 42 screw into projections 49 and 50 on a conducting base 51 preferably of copper. The base 51 is provided with a vertical chamber 52 which registers with the center of disk 41 on the left, and with a vertical chamber 53 which opens into the slot in disk 41 on the right near the periphery of said disk. The chambers 52 and 53 open into a horizontal chamber 54 closed at one end by the metal of the base 51 and at the other by a plug 55 driven thereinto. The chambers 52 and 53 are lined with insulating tubing 56 and the chamber 54 with similar tubing 57. The lining of these chambers may be omitted.

46$'$ represents insulating cement packing to prevent leakage of the liquid conductor past tubes 46.

The plug 32 is removed and mercury 58 or other suitable liquid conductor is poured into chamber 30 passing down through the various elements of member 39 as shown, thence up through member 38 until it reaches a desired level 59 in chamber 27. If desired oil 60 may be put on top of the column of mercury in the chamber 27 for lubricating the bearing 35 and breaking up the mercury stream from the propeller as it falls into the chamber 27, thus preventing a short circuit. The mercury is further broken up by the holes 60$'$ in a small insulating disk 60$^2$ in the column 27.

When the terminals 25 and 26 are connected to a source of current, alternating or direct, current will pass say from terminal 25 through the member 38 base 51, member 39 thence to terminal 26.

In accordance with the theory above set forth the mercury at the center of said elements will be under a greater hydrostatic pressure due to the current passing through it than at the periphery of said elements, hence the mercury is forced from chamber 27 downward through the tube opening into the axis of the column of mercury in chamber 27, thence from said tube to a point of lower pressure near the periphery of the next element 40. The pressure towards the axis of the disk 41, next beneath said element will force the liquid to the axis of said disk, whence it will pass into the next tube 46 below said disk and so on around to chamber 30, whence the liquid passes under the combined pressures of the several superposed couples or elements until it is forced against the screw 28. The mercury thus rotates the screw 28 and passes along tube 33 into chamber 27 again. The screw 28 may thus continue to rotate as long as current passes through the apparatus as described. The rotation of said screw imparts through the shaft 34 rotation to pulley 37, which may be connected to any desired piece of apparatus.

I may use in the place of mercury a liquid alloy of metallic sodium and potassium, or any other suitable liquid conductor.

By adding the several pressures in series as described considerable power may be obtained. It should also be noted that the hydrostatic pressure obtained is independent of the axial length of the liquid strata, while the heat developed by the current is directly as this length. With this consideration in mind, the axial length of the liquid portions of the apparatus from which the pressure is derived may be extremely small. By lessening these axial lengths the efficiency of the apparatus is not lessened, and cool running is greatly improved.

With a liquid conductor one half inch in diameter and one thousand cells or conductor sections of say one MM length each and with a current of six hundred amperes, a pressure of 43.2 pounds per square inch could be obtained, and this without iron in the circuit. This pressure would sustain a column of mercury over seven feet high. A much greater pressure with the same amount of current could be obtained with the iron disks between the successive sections of mercury hereinbefore described.

The above described apparatus is only one of many ways of utilizing the pressure on the interior of a conductor to produce motive power. This force which depends only on the square of the current and linear dimensions may be used as an accurate measure of the current, either direct or alternating. With this in view I have devised several forms of ammeters two of which I have shown in this application.

One form of ammeter constructed according to my invention is shown in Figs. 10 and 11. This instrument comprises among other parts two cylindrical members 61 and 62 each built up of a series of superposed elements consisting of copper or other non-magnetic metal disks 63 screw threaded exteriorly on each side of an annular heat dissipating flange 64, the said elements being held rigidly by interiorly screw threaded rings 65 preferably of some suitable high resistance metal, there being left between the successive elements 63 a space 66 to be filled with the liquid conductor. Passing through each of said elements in a slanting direction from the one face at a point coincident with the center of said face to the other face of the element at a point near the periphery thereof is an opening 67 lined with insulating tubing 68. The elements in the member 61 are arranged one above the other so that the openings therethrough which merge at the axes of the elements will be on top while the openings at the periphery will be at the bottom of the element. In the member 62 this condition is reversed as will be observed from the drawings. The uppermost rings 65 of the members 61 and 62 receive the lower ends respectively of two metallic conducting plugs 69 and 70 of copper or other suitable material, the said plugs being screw-threaded into the said rings as shown. The plugs 69 and 70 are provided with chambers 71 and 72 respectively, which chambers communicate by means of openings 73 and 74 respectively with spaces 75 and 76 above the uppermost elements of the members 61 and 62. The plugs 69 and 70 are screw threaded respectively into heavy terminals 77 and 78 which may be of copper or other suitable material. Screw threaded on the upper portion of the plug 69 is a short tube 79 which is fitted with a cap 80 adapted to close the top of said tube. Passing through the top of this cap 80 down into the interior of tube 69 is a milled screw 81, the function of which is to regulate the normal height of the liquid in the indicating tube as hereinbefore described. Screwed onto the top of the plug 70 is a short tube 82 into the upper end of which is screwed a plug 83 the latter being provided with a small opening 84 passing vertically through its center. Made fast in the opening 84 is a small vertical glass tube 85, on one side of which is secured a vertical scale 86. Inclosing the vertical tube 85 and scale 86 is a glass tube 87 which is rigidly fitted in the annular opening 88 in the plug 83.

The lowermost rings 65 of the members 61 and 62 are screw threaded onto the projections 89 and 90 on the upper face of a conducting yoke 91 of copper or other suitable low resistance metal, said extensions 89 and 90 being separated from the lowermost elements 63 by spaces 92 and 93 respectively. The space 92 communicates with the space 93 through the chamber 94 in the yoke 91. 95 represents the plug for closing one end of the chamber 94. 96 indicates the liquid conductor which occupies all of the spaces 66, 75, 76, the interior of tube 68, spaces 92, and 93 and chamber 94. Rising normally to a suitable level in the tubes 79 and 82 as indicated. This liquid conductor may consist of mercury or any other suitable material as stated with respect to the apparatus hereinbefore described. Above the mercury or other conductor 96 in the tube 82 is placed a suitable colored liquid 97 which extends up a considerable distance in the tube 85 normally to the zero point on said scale.

By applying an electric current to the terminals 77 and 78 an internal pressure is set up in the mass of conductor 96 which acts to force the said conductor from points in line with the axes of the members 61 and 62 outwardly toward the periphery of said members. the pressures between the successive elements 63 being added one to the other as hereinbefore described and forcing the liquid conductor 96 in the plug 72 upward against the colored liquid 97 causing the latter to rise in the glass tube 85. As the height to which said liquid will rise in said tube is proportional to the square of the current the scale 86 may readily be calibrated in amperes. The liquid in the vertical tube 85 may be adjusted to zero before the measurement is made by adjusting the screw 81.

It will be readily observed that the cylindrical members 38 and 39 of the apparatus as shown in Fig. 4 may be substituted for the members 61 and 62 of the form of apparatus just described. In case the said substitution, however, is made, the soft iron disks in the apparatus shown in Fig. 4 should be omitted. It will also be obvious that the members 61 and 62 of the apparatus shown in Fig. 10 may be substituted for the members 38 and 39 in the apparatus shown in Fig. 4.

Another form of ammeter constructed in accordance with the principles of my present invention is shown in Figs. 12 to 17 inclusive, in which 98 and 99 represent two blocks of hard wood or other suitable insulating material placed face to face and held together rigidly; 100, 101, cylindrical plugs of copper or other suitable low resistance conducting material passing through said blocks and registering with each other as indicated, the superposed plugs being separated from each other by a small space 102 (see Fig. 16); and 103 small tubes of insulating material extending from a point in the axes of one pair of said superposed plugs to a point at or near the periphery of an adjacent pair of said plugs, the said plugs being provided with a small groove 104 to receive said tubes. Extending axially through the upper plugs 100 on the extreme left are openings 105 and 106 respectively which are screw threaded interiorly and receive respectively two receptacles 107, and 108, the former being provided with a cap 109, while the top of the latter receptacle is closed by means of a plug 110 through the axis of which passes an opening 111 in which is inserted a small glass tube 112 which may be extended upward to a desired height. Adjacent to this tube 112 is located a vertical scale 113, and inclosing said scale and tube is a vertical tube 114. The plugs 100, 101 are connected in series by means of metallic connecting plates 115, 116 secured to the faces of the blocks 98 and 99 respectively, as shown. The upper plugs 100 which carry the receptacles 107 and 108 are electrically connected to terminal plates 117 and 118 which may be provided with screw holes 119 for attaching current terminals.

The plugs and connecting plates may be protected from possible contact with outside conductors by means of plates of insulation 120, 121.

122 indicates the mercury or other liquid conductor, the internal pressure of which is to be utilized, and 123 a suitable colored liquid preferably of lower density placed in the receptacle 108 above the mercury to extend up into the tube 111.

It will be observed that tubes 103 pass from a point of maximum pressure at the center of the liquid conductor between superposed plugs, to a point of minimum pressure, at the periphery of the next liquid conductor between superposed plugs, therefore when current is applied at the terminals of this instrument the hydrostatic pressures produced at the axes of the liquid conducting material between superposed plugs will be added in series, with the result that the liquid in reservoir 108 will be forced upward, causing the liquid in tube 112 to rise to a height dependent upon the strength of the current. By properly calibrating the scale 113 the height of the column in tube 112 may be made to indicate the quantity of current.

Having thus described my invention what I claim is:—

1. The method of producing motion electrically, which consists in passing an electric current through a conductor to cause internal pressure in the mass of said conductor, and causing the said pressure to act upon a body capable of motion.

2. The method of producing motion electrically which consists in passing an electric current through a conductor to cause internal pressures within the mass of said conductor, combining these pressures in series, and causing the combined force of a plurality of the same to act upon a body capable of motion.

3. An electric conductor having a plurality of chambers containing a liquid conductor, said chambers only communicating with each other by a passage passing from a point near the center of one chamber to a point more remote from the center of an adjacent chamber.

4. An electric conductor having a plurality of chambers containing a liquid conductor and a mass of magnetic material, said chambers only communicating with each other by a passage passing from a point near the center of one chamber to a point more remote from the center of an adjacent chamber.

5. A heterogeneous electrical conductor comprising superposed liquid and solid conducting masses having means to transmit pressure at or near the center of one of said liquid masses due to the passage of electric current through said conductor, to a point of lower pressure more remote from the center of another of said liquid masses.

6. A series of solid electrical conductors, a series of masses of liquid conducting material interposed between said solid conductors, means to transmit the hydrostatic pressure due to an electric current therethrough from a point near the center of one of said liquid conducting masses to a point more remote from the center of another of said masses, and a movable body operative by the combined action of said pressures.

7. Means to produce motion electrically comprising a heterogeneous electric conductor adapted to transmit pressure at or near the axis of said conductor due to an electric current therethrough to a point of lower pressure more remote from the axis of said conductor, and a body movbale by said pressure.

8. An electrical measuring instrument, comprising an electric conductor, and indicating means operative by the difference in pressure between two points unequal distances from the axis of said conductor, due to current therein.

9. An electrical measuring instrument, comprising a liquid electric conductor, a receptacle therefor, and indicating means operative by internal pressure within the mass of said conductor due to the passage of an electric current therethrough.

10. An electrical measuring instrument comprising an electric conductor consisting of a liquid sodium and potassium alloy, a receptacle therefor, and indicating means operative by internal pressure within the mass of said conductor due to the passage of an electric current therethrough.

11. An electrical measuring instrument having a plurality of chambers containing a liquid conductor, said chambers communicating with each other only by a passage passing from a point near the center of one chamber to a point more remote from the center of an adjacent chamber, and indicating means operated by the pressure in said liquid conductor due to an electric current therein.

12. The combination with a plurality of cells formed between solid masses of electrical conducting material and opening one into the other through a duct leading from a point near the central axis of one cell to a point in the other cell nearer the periphery thereof, of a liquid electric conductor contained in said cells and duct, electric terminals connected to the electric conductor in the respective cells, a scale, and an indicator for said scale adapted to be operated by the displacement of said liquid conductor due to the hydrostatic pressure created therein by the passage of an electric current therethrough.

13. The method which consists in causing an hydrostatic pressure within the mass of a liquid conductor by passing an electric current therethrough, providing for the displacement of said conductor due to said pressure, and utilizing this displacement to measure the current.

In testimony whereof I affix my signature in presence of two witnesses.

EDWIN F. NORTHRUP.

Witnesses:
 FRANCIS S. MAGUIRE,
 JOHN H. HOLT.